(12) United States Patent
Xu et al.

(10) Patent No.: US 8,494,966 B2
(45) Date of Patent: Jul. 23, 2013

(54) METHOD AND APPARATUS FOR FACILITATING THE TRANSFER OF A SOFTWARE LICENSE BETWEEN COMPUTER SYSTEMS

(75) Inventors: Xuejun Xu, Cupertino, CA (US); Katherine K. Nadell, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2804 days.

(21) Appl. No.: 11/144,516

(22) Filed: Jun. 3, 2005

(65) Prior Publication Data

US 2013/0125240 A1 May 16, 2013

(51) Int. Cl.
*H04K 1/00* (2006.01)
*H04L 9/00* (2006.01)

(52) U.S. Cl.
USPC ............... 705/59; 705/51; 705/57; 705/71; 705/75

(58) Field of Classification Search
USPC ............... 705/59, 16, 21, 58, 71; 380/262, 380/278, 279
See application file for complete search history.

(56) References Cited

U.S. PATENT DOCUMENTS

| 4,458,315 | A | | 7/1984 | Uchenick |
| 4,593,353 | A | | 6/1986 | Pickholtz |
| 4,658,093 | A | | 4/1987 | Hellman |
| 5,103,476 | A | | 4/1992 | Waite et al. |
| 5,222,134 | A | | 6/1993 | Waite et al. |
| 5,553,139 | A | | 9/1996 | Ross et al. |
| 6,009,401 | A | * | 12/1999 | Horstmann ................ 705/317 |
| 6,029,145 | A | | 2/2000 | Barritz et al. |
| 2005/0132347 | A1 | * | 6/2005 | Harper et al. ............... 717/168 |
| 2006/0106727 | A1 | * | 5/2006 | Yellai et al. ................. 705/59 |

* cited by examiner

*Primary Examiner* — Dante Ravetti
(74) *Attorney, Agent, or Firm* — Wolfe-SBMC

(57) ABSTRACT

One embodiment of the present invention provides a system that facilitates the transfer of a software license from a first client to a second client. The system operates by receiving a request at the first client to deactivate the software license for an associated application installed on the first client. The system then receives a deactivation request that includes an identifier for the license at a license activation server from the first client. Next, the system validates the identifier on the license activation server to determine if the identifier is a valid identifier. If so, the system sends a deactivation message to the first client, receives a deactivation response from the first client, and increments a count of license instances available for the identifier on the license activation server.

20 Claims, 3 Drawing Sheets

METHOD AND APPARATUS FOR FACILITATING THE TRANSFER OF A SOFTWARE LICENSE BETWEEN COMPUTER SYSTEMS

BACKGROUND

1. Field of the Invention

The present invention relates to computer systems. More specifically, the present invention relates to a method and an apparatus for facilitating the transfer of a software license between computer systems.

2. Related Art

As computer networks, such as the Internet, make it easier to distribute information, software piracy becomes a growing concern. Many software producers rely on software activation techniques to help combat piracy while minimizing the hassle to legitimate users of their software. One such technique involves sending a license number or key for the software over the Internet to an activation server. The activation server then verifies the license number or key and sends back an activation message to the application informing the application about whether the activation was successful. If so, the software then unlocks its features, which allows a user to use the software.

Presently there is no easy way for the user to transfer the license of software installed on one machine to another machine. If a user buys a new computer and wants to move all of the programs from his or her old computer to the new computer, the user typically has to reinstall the applications on the new computer. Upon reinstalling, the software will then need to be activated. Some software producers, in order to provide greater customer service, allow the software to be installed with a previously used serial number or key if a certain amount of time has passed. However, allowing this type of activation reduces the amount of control software producers have over the activation of their software. Under this scheme, it is possible to install and activate the software on multiple machines over time, with only one serial number or key.

Hence, what is needed is a method and an apparatus that facilitates transferring software from one machine to another machine without the problems listed above.

SUMMARY

One embodiment of the present invention provides a system that facilitates the transfer of a software license from a first client to a second client. The system operates by receiving a request at the first client to deactivate the software license for an associated application installed on the first client. The system then receives a deactivation request that includes an identifier for the license at a license activation server from the first client. Next, the system validates the identifier on the license activation server to determine if the identifier is a valid identifier. If so, the system sends a deactivation message to the first client, receives a deactivation response from the first client, and increments a count of license instances available for the identifier on the license activation server.

In a variation of this embodiment, upon receiving the deactivation message at the first client, the first client deactivates the software license, thereby rendering the associated application unusable.

In a variation of this embodiment, the system receives a request at the second client to activate the software license for the associated application installed on the second client. In response to this request, the system receives an activation request that includes the identifier for the license from the second client at the license activation server. Next, the system validates the identifier on the license activation server to determine if the identifier is a valid identifier, and that the count of license instances available for the identifier is greater than zero. If so, the system sends an activation message to the second client, and decrements the count of license instances available for the identifier on the license activation server.

In a further variation, upon receiving the activation message at the second client, the second client activates the software license to make the associated application usable on the second client.

In a variation of this embodiment, if the identifier is not a valid identifier, the system sends a deactivation message to the first client, and does not increment the count of license instances on the license activation server.

In a variation of this embodiment, the identifier includes a license serial number and a machine identifier that uniquely identifies a machine on which the first client is operating.

In a variation of this embodiment, the system includes a third client which performs functions of the license activation server in addition to the functions of a client, thereby making it possible to directly transfer the software license from the first client to the third client.

In a variation on this embodiment, the deactivation message includes a machine type for the client. In this variation, the transfer of the software license is only allowed if the machine type for either the transferring or the receiving client matches a specified machine type.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network that Facilitates Software License Transfers

Figure 1:
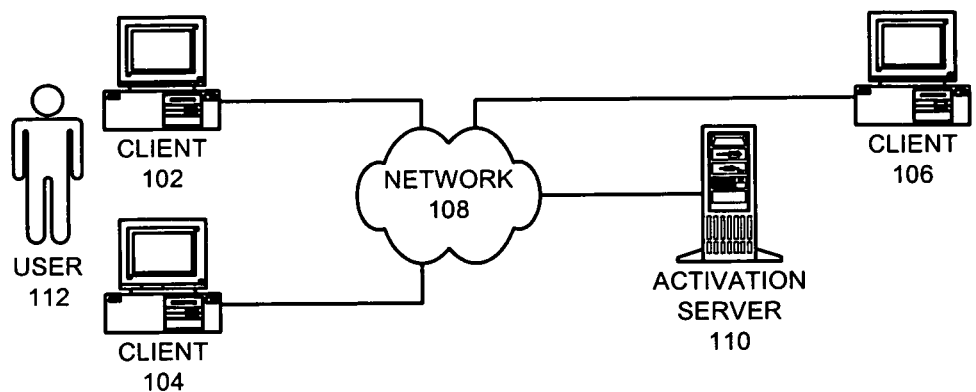
FIG. 1 illustrates a computer network that facilitates software license transfers in accordance with an embodiment of the present invention.

FIG. 1 illustrates a computer network 108 that facilitates software license transfers in accordance with an embodiment of the present invention. Note that network 108 can generally include any type of wired or wireless communication channel capable of coupling together computing nodes. This includes, but is not limited to, a local area network, a wide area network, or a combination of networks. In one embodiment of the present invention, network 108 includes the Internet.

Clients 102-106 are coupled to network 108. Clients 102-106 can generally include any node on a network including computational capability and including a mechanism for communicating across the network. Activation server 110 is also coupled to network 108. Activation server 110 can generally include any computational node including a mechanism for servicing requests from a client for computational and/or data storage resources.

Software License Transfer

Figure 2:
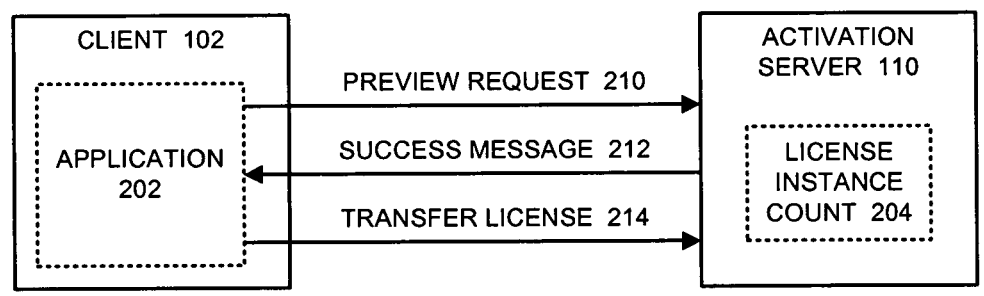
FIG. 2 illustrates a software license transfer in accordance with an embodiment of the present invention.

FIG. 2 illustrates a software license transfer in accordance with an embodiment of the present invention. Note that the software license is an agreement that specifies a number of allowable installed instances of an application. Transferring the software license refers to moving an installed instance of the application from one machine to another. One embodiment of the present invention provides a two step approach in transferring a software license from one client to another. The first step, described in more detail in FIG. 3, involves deactivating a license on a client (such as client 102) that already has an active software license. As illustrated in FIG. 2, client 102 has an active license for application 202. In this instance, user 112 wishes to transfer the license for application 202 to client 104.

Figure 4:
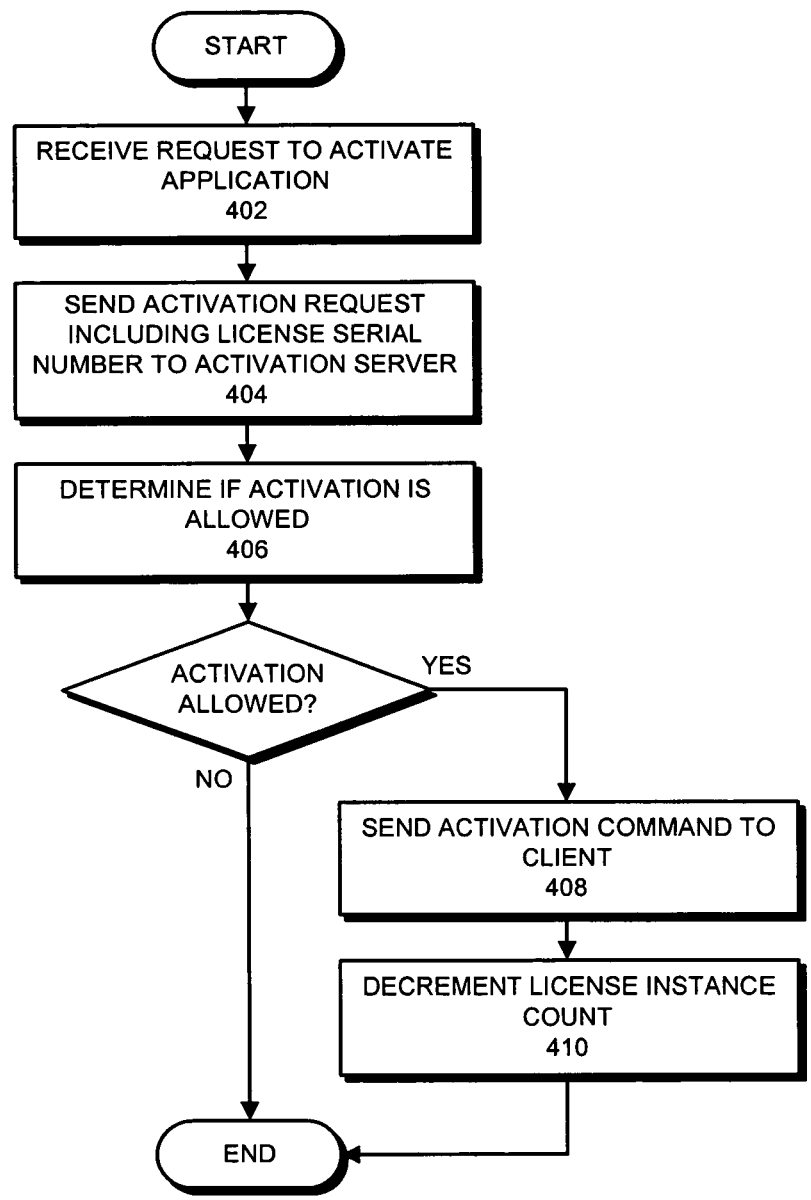
FIG. 4 presents a flowchart illustrating the process of activating a software license on a client in accordance with an embodiment of the present invention.

The other step, which is described in more detail in FIG. 4, involves activating the transferred license on the new client. This step is the same as for new activations, and is independent of the first step. In other words, the transfer can take place over an indefinite period of time. For example, user 112 could initiate the transfer of the software license for application 202 from client 102 to client 104 at any time. In addition, user 112 can complete the steps for deactivating the software license on client 102 well in advance of activating the software license on client 104.

In one embodiment of the present invention, the process of deactivating application 202 is a two-stage process. This two-stage process helps eliminate potential problems with the software license transfer process. First, if application 202 is deactivated before activation server 110 receives the deactivation message, it is possible that license instance count 204 on activation server 110 would not be incremented and the total available instances would be reduce by one. This could happen for any number of reasons, including network connectivity issues or activation server 110 being unavailable.

A second potential issue for a one-stage process involves the risk of more instances of application 202 being in an activated state than the software license allows. If application 202 sends the deactivation request to activation server 110, and activation server 110 increments license instance count 204 before application 202 is deactivated on client 102, it would be possible for user 112 to disconnect the network connection between client 102 and network 108 prior to the deactivation message reaching client 102. This would result in another available instance of application 202 on activation server 110, that could in turn be activated on client 104, while application 202 is still activated on client 102.

One embodiment of the present invention obviates these potential problems by implementing the aforementioned two-stage process. In this embodiment, upon receiving a deactivation request, application 202 sends preview request 210 (a preview of the potential deactivation transaction) to activation server 110. Preview request 210 includes the license serial number. Note that the present invention is not meant to be limited to serial numbers, but would apply to any identifier for the software license for application 202. This could include a alpha-numeric string, a CD key, or any other identification method.

Preview request 210 facilitates determining network connectivity and the availability of all required resources. If network 108 or activation server 110 are not functioning properly, then application 202 will not receive success message 212 and the deactivation of application 202 will not take place.

Upon receiving preview request 210, application server 110 verifies the license serial number and potentially performs other validation measures. Once activation server determines that everything is in order, activation server 110 sends success message 212 to application 202. At this point, application 202 becomes unusable to user 112, and application 202 sends a transfer license message 214 to activation server 110. Upon receiving transfer license message 214 at activation server 110, activation server 110 increments license instance count 204 to allow for an additional instance of application 202 to be activated on another client. Note that it is possible, but highly unlikely, for an event to take place that stops transfer license message 214 from reaching activation server 110. In this rare case, it would be necessary for someone to manually increment license instance count 204 on activation server 110.

In another embodiment of the present invention, if during the preview request phase on activation server 110 it is determined that the license serial number is invalid, the rest of the operations continue as normal but the license instance count 204 is not incremented. This results in the unlawful instance of application 202 to be deactivated without the ability for user 112 to reactivate application 202 on another client, such as client 106.

Deactivating a Software License on a Client

Figure 3:
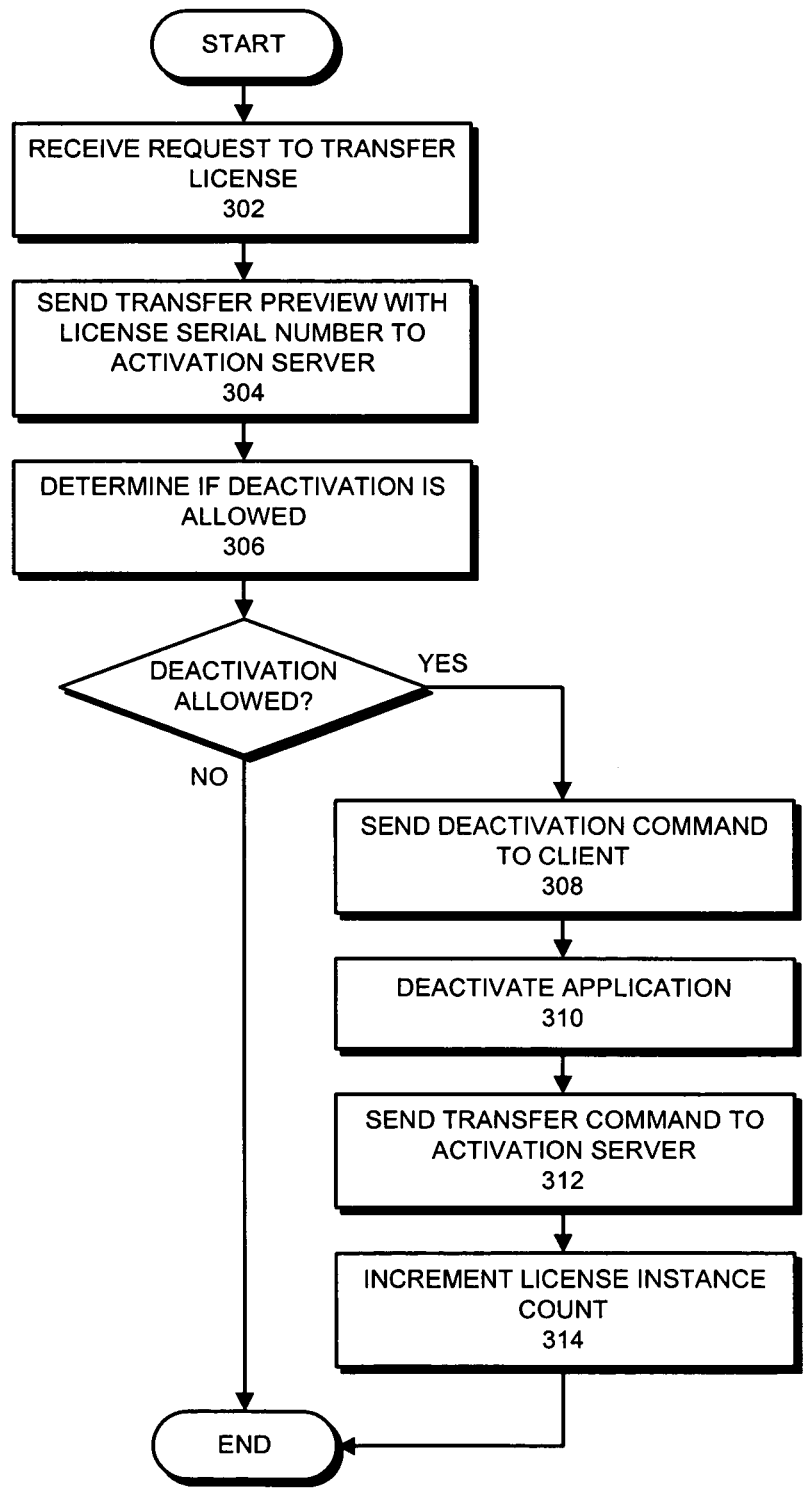
FIG. 3 presents a flowchart illustrating the process of deactivating a software license on a client in accordance with an embodiment of the present invention.

FIG. 3 presents a flowchart illustrating the process of deactivating a software license on a client in accordance with an embodiment of the present invention. The system starts when a request is received to transfer a license from a client 102 (step 302). In response to the request, the system then sends a transfer preview with the license serial number to the activation server 110 (step 304). Activation server 110 then determines if deactivation is allowed (step 306). Note that this can include determining if the license serial number is a valid serial number. If not, application server 110 does nothing. Note that, as mentioned previously, activation server 110 could continue with the steps as if the license serial number was valid but not increment license instance count 204, thus resulting in the elimination of an invalid instance of application 202.

If deactivation is allowed, activation server 110 sends a deactivation message to client 102 (step 308). In response to this message, client 102 deactivates application 202 (step 310). Client 102 also sends a transfer command to activation server 110 (step 312). In response to the transfer command, activation server 110 increments license instance count 204 (step 314).

Activating a Software License on a Client

FIG. 4 presents a flowchart illustrating the process of activating a software license on a client in accordance with an embodiment of the present invention. The system starts by receiving a request to activate application 202 on client 104 (step 402). In response to the request, client 104 sends an activation request, including a license serial number, to activation server 110 (step 404). Upon receiving the request, activation server 110 determines if activation is allowed and if the license instance count 204 is greater than zero (step 406). Note that determining if activation is allowed can include determining if the license serial number is a valid license serial number. If not, the system ends, and application 202 is not activated.

If activation is allowed and the license instance count 204 is greater than zero, activation server 110 sends an activation command to client 104 (step 408) and decrements license instance count 204 (step 410). In response to the activation command, client 104 activates application 202.

In another embodiment of the present invention, activation and deactivation requests involve sending other information in addition to the license serial number to be considered by activation server 110 during the activation and/or deactivation process. For example, a software license might allow for one instance of application 202 on a workstation, but unlimited instances on mobile devices. In this example, activation server 110 would consider the machine type when determining if an activation, or an incrementing of license instance count 204 should be allowed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating the transfer of a software license from a first client to a second client, wherein upon receiving a request at the first client to deactivate the software license for an associated application installed on the first client, the method comprises:
using a computer to perform:
receiving a deactivation request from the first client at a license activation server, wherein the deactivation request includes an identifier for the software license installed on the first client;
validating the identifier for the software license installed on the first client, wherein the license activation server determines whether the identifier for the software license installed on the first client is a valid identifier; and
in response to determining that the identifier for the software license installed on the first client is a valid identifier:
sending a deactivation message to the first client,
receiving a deactivation response from the first client, and
incrementing a count of license instances available for the associated application on the license activation server.

2. The method of claim 1, wherein upon receiving the deactivation message at the first client, the first client deactivates the software license, thereby rendering the associated application unusable.

3. The method of claim 1, further comprising:
sending a request from the license activation server to the second client to activate the software license for the associated application installed on the second client;
receiving an activation request from the second client at the license activation server, wherein the activation request includes an identifier for the software license;
validating the identifier on the license activation server to determine whether the identifier is a valid identifier, and whether the count of license instances available for the identifier is greater than zero; and
in response to determining that the identifier for the software license is a valid identifier, and that the count of license instances available for the identifier is greater than zero:
sending an activation message to the second client; and
decrementing the count of license instances available for the associated application on the license activation server.

4. The method of claim 3, wherein upon receiving the activation message at the second client, the second client activates the software license to make the associated application usable on the second client.

5. The method of claim 1, further comprising:
receiving another deactivation request from the first client at a license activation server, wherein the deactivation request includes an identifier for the software license installed on the first client; and
in response to validating the identifier for the software license installed on the first client on the license activation server and determining that the identifier for the software license installed on the first client is not a valid identifier:
sending the deactivation message to the first client; and
not incrementing the count of license instances available for the associated application on the license activation server.

6. The method of claim 1, wherein the identifier includes a license serial number and a machine identifier that uniquely identifies a machine on which the first client is operating.

7. The method of claim 1, wherein said receiving a deactivation request, validating the identifier, sending a deactivation message, receiving a deactivation response, and incrementing a count of license instances are performed by the second client.

8. The method of claim 1, wherein the deactivation message includes a machine type for the client, wherein the transfer of the software license occurs in response to determining that the machine type of either the first client or the second client matches a specified machine type.

9. A non-transitory computer-readable storage medium storing instructions that when executed by a computer cause the computer to perform a method for facilitating the transfer of a software license from a first client to a second client, wherein upon receiving a request at the first client to deactivate the software license for an associated application installed on the first client, the method comprises:
receiving a deactivation request from the first client at a license activation server, wherein the deactivation request includes an identifier for the software license installed on the first client;
validating the identifier for the software license installed on the first client, wherein the license activation server determines whether the identifier for the software license installed on the first client is a valid identifier; and
in response to determining that the identifier for the software license installed on the first client is a valid identifier:
sending a deactivation message to the first client,
receiving a deactivation response from the first client, and incrementing a count of license instances available for the associated application on the license activation server.

10. The non-transitory computer-readable storage medium of claim 9, wherein upon receiving the deactivation message at the first client, the first client deactivates the software license, thereby rendering the associated application unusable.

11. The non-transitory computer-readable storage medium of claim 9, further comprising:
   sending a request from the license activation server to the second client to activate the software license for the associated application installed on the second client;
   receiving an activation request from the second client at the license activation server, wherein the activation request includes an identifier for the software license;
   validating the identifier on the license activation server to determine whether the identifier is a valid identifier, and whether the count of license instances available for the identifier is greater than zero; and
   in response to determining that the identifier for the software license is a valid identifier, and that the count of license instances available for the identifier is greater than zero:
   sending an activation message to the second client, and decrementing the count of license instances available for the associated application on the license activation server.

12. The non-transitory computer-readable storage medium of claim 11, wherein upon receiving the activation message at the second client, the second client activates the software license to make the associated application usable on the second client.

13. The non-transitory computer-readable storage medium of claim 9, wherein the program instructions are further executable to receive another deactivation request from the first client at a license activation server, wherein the deactivation request includes an identifier for the software license installed on the first client; and
   in response to validating the identifier for the software license installed on the first client on the license activation server and determining that the identifier for the software license installed on the first client is not a valid identifier:
   send the deactivation message to the first client; and
   not increment the count of license instances on the license activation server.

14. The non-transitory computer-readable storage medium of claim 9, wherein the identifier includes a license serial number and a machine identifier that uniquely identifies a machine on which the first client is operating.

15. The non-transitory computer-readable storage medium of claim 9, wherein said receiving a deactivation request, validating the identifier, sending a deactivation message, receiving a deactivation response, and incrementing a count of license instances are performed by the second client.

16. The non-transitory computer-readable storage medium of claim 9, wherein the deactivation message includes a machine type for the client, wherein the transfer of the software license occurs in response to determining that the machine type of either the first client or the second client matches a specified machine type.

17. A system, comprising:
   one or more processors;
   memory coupled to the one or more processors and storing program instructions executable by the one or more processors to transfer a software license from a first client to a second client upon receiving a request at the first client to deactivate the software license for an associated application installed on the first client, wherein the program instructions are further executable by the one or more processors to:
   receive a deactivation request from the first client at a license activation server, wherein the deactivation request includes an identifier for the software license installed on the first client;
   validate the identifier for the software license installed on the first client, wherein the license activation server determines whether the identifier for the software license installed on the first client is a valid identifier; and
   in response to determining that the identifier for the software license installed on the first client is a valid identifier:
   send a deactivation message to the first client;
   receive a deactivation response from the first client; and
   increment a count of license instances available for the associated application on the license activation server.

18. The system of claim 17, wherein the program instructions are further executable to deactivate the software license upon receiving the deactivation message at the first client, thereby rendering the associated application unusable on the first client.

19. The system of claim 17, wherein the program instructions are further executable to:
   send a request from the license activation server to the second client to activate the software license for the associated application installed on the second client;
   receive an activation request from the second client at the license activation server, wherein the activation request includes an identifier for the software license;
   validate the identifier on the license activation server to determine whether the identifier is a valid identifier, and whether the count of license instances available for the identifier is greater than zero; and
   in response to determining that the identifier for the software license is a valid identifier, and that the count of license instances available for the identifier is greater than zero:
   send an activation message to the second client; and
   decrement the count of license instances available for the associated application on the license activation server.

20. The system of claim 17, wherein the program instructions are further executable to activate the software license upon receiving the activation message at the second client, thereby rendering the associated application usable on the first client.

* * * * *